United States Patent [19]

Akashi et al.

[11] 3,821,025

[45] June 28, 1974

[54] MAGNETIC RECORDING MATERIAL

[75] Inventors: Goro Akashi; Yasuyuki Yamada, both of Odawara, Japan

[73] Assignee: Fuji Photo Film Co., Ltd., Kanagawa, Japan

[22] Filed: Oct. 5, 1971

[21] Appl. No.: 186,788

[30] Foreign Application Priority Data

Oct. 5, 1970 Japan ............................... 45-87412

[52] U.S. Cl. ................. 117/235, 117/237, 117/240, 117/161 P, 252/62.54

[51] Int. Cl. ............................................ H01f 10/02

[58] Field of Search ............................ 117/235–240, 117/161 P; 252/62.54

[56] References Cited

UNITED STATES PATENTS

| | | | |
|---|---|---|---|
| 3,387,995 | 6/1968 | Senkpiel et al. | 117/235 |
| 3,458,480 | 7/1969 | Schmidt et al. | 117/232 X |
| 3,472,815 | 10/1969 | Juveland | 117/232 X |
| 3,523,824 | 8/1970 | Powers et al. | 117/235 X |
| 3,551,202 | 12/1970 | Wright et al. | 117/240 X |
| 3,554,984 | 1/1971 | George | 117/161 X |
| 3,630,772 | 12/1971 | Seidel | 117/235 |

*Primary Examiner*—William D. Martin
*Assistant Examiner*—Bernard D. Pianalto
*Attorney, Agent, or Firm*—Sughrue, Rothwell, Mion, Zinn & Macpeak

[57] ABSTRACT

A thermally stable magnetic recording material comprising a. a support and b. a magnetic layer, said magnetic layer being composed of a finely divided powder of ferromagnetic material, which is dispersed in a binder of a polyamide imide resin.

1 Claim, No Drawings

MAGNETIC RECORDING MATERIAL

BACKGROUND OF THE INVENTION

1. Field of the Invention

This invention relates to a magnetic recording material, and specifically, to a binder component for use in a magnetic layer of a magnetic recording material.

2. Description of the Prior Art

Conventional magnetic recording materials are produced by coating a substrate of plastic film, such as polyethylene terephthalate, cellulose diacetate, cellulose triacetate or polyvinyl chloride with a dispersion of a finely divided powder of ferromagnetic material in a solution of a synthetic resin, and drying the coating. Examples of the synthetic resin include a vinyl chloride/-vinyl acetate copolymer, poly(butyl acrylate), nitrocellulose, cellulose propionate, cellulose acetate butyrate, ethyl cellulose, a polyvinyl acetate, styrene/butadiene copolymer, vinyl fluoride resin, a vinylidene chloride copolymer, a butadiene/acrylonitrile copolymer, chlorinated polypropylene, polyvinyl butyral, a chlorinated vinyl chloride resin, a vinyl acetate/ethylene copolymer, phenol resins, epoxy resins, polyamide resins, polyurethane resins, polyester resins, polyether resins, melamine formaldehyde resins, urea formaldehyde resins, alkyd resins, acrylic resins, silicon resins, or modified products of these. These resins are used either alone or in combination of two or more.

These conventional magnetic recording materials are inferior in thermal stability, and magnetic tapes comprising a polyethylene terephthalate support and the above-mentioned binder, which are now generally used, can withstand temperatures of 90°C. at the highest. In recent years, it has been required to perform magnetic recording at high temperatures in space exploitation or industrial metrology, and the development of a magnetic recording media having high thermal stability has been demanded.

SUMMARY OF THE PRESENT INVENTION

Accordingly, it is an object of the present invention to provide magnetic recording materials, which can retain the physical properties required of a magnetic recording medium, at a temperature above 200°C, and for short periods of use, at a temperature above 400°C.

According to the present invention, there is provided a magnetic recording material comprising a substrate and a magnetic layer of a finely divided ferromagnetic material dispersed in a binder, wherein a polyamide imide resin is used as the binder.

DETAILED DESCRIPTION OF THE INVENTION

The polyamide imide resin used as the binder in the present invention is a polymer of a structure in which an amide group is introduced into the main chain of the polyimide. Many varieties of polyamide imide resins are commercially available, and can be optionally utilized in the present invention. Generally, the polyamide imide resins are prepared as follows:

SYNTHESIS OF AMOCO AI POLYMER

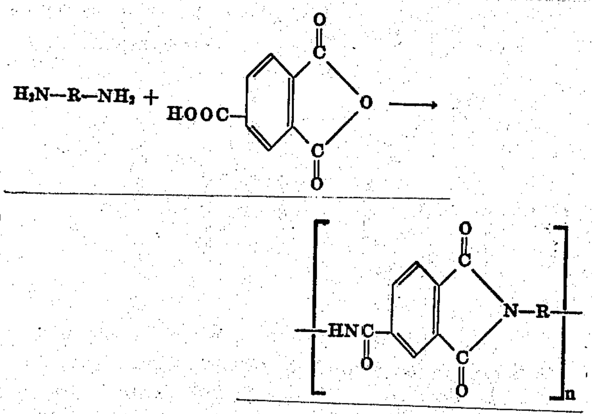

There has been reported a method for producing polyamide imides by synthesizing tetracarboxylic anhydrides from diacetyldiamines and trimellitic anhydride, and polymerizing them with diamines. Schematically, this is illustrated as:

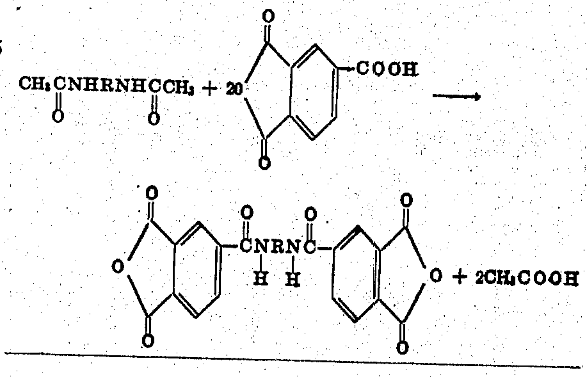

There has also been found a method for producing polyamide imides by synthesizing aromatic diamines containing amide linkages, and reacting the resulting diamine derivatives with pyromellitic anhydride in accordance with the following reaction equation:

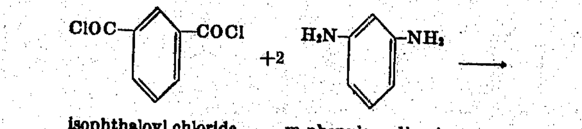

isophthaloyl chloride    m-phenylene diamine

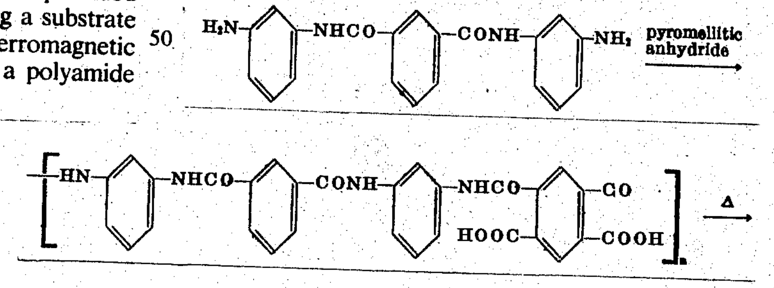

polyamide-acid (polyamic acid)

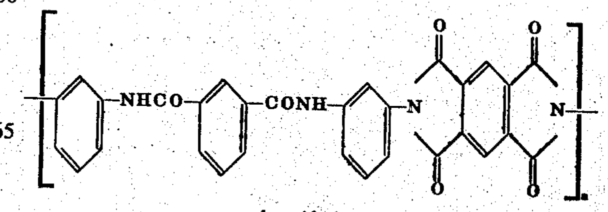

polyamide imide    $+2H_2O$

Polyamide imide resins of the following structures are also known:

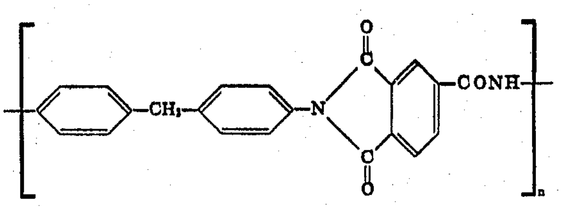

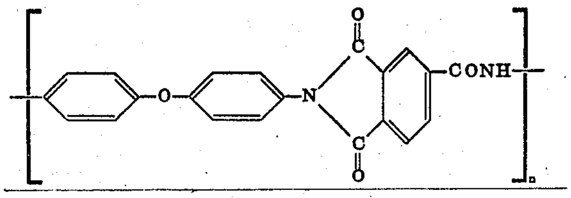

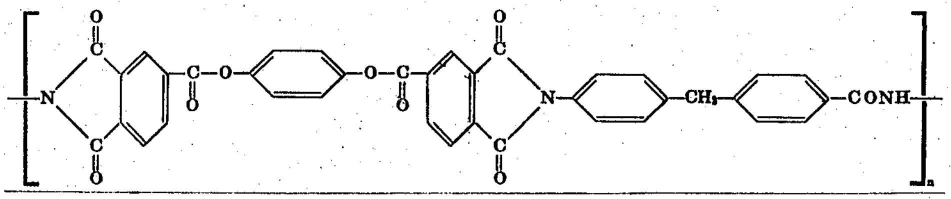

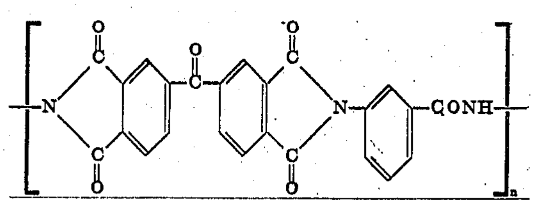

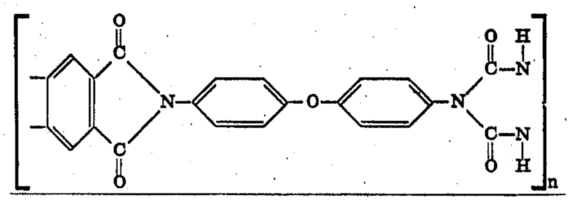

Polyamide imide resins are generally known as thermally stable polymers, and any polyamide imide, which form a tough film can be used preferably in the present invention. The present invention is therefore not limited to the polyamide imides exemplified above. However, those polyamide imides which have desirable properties as a binder for the present invention have a molecular weight ranging from 10,000 to 60,000.

As the solvent for dissolving the polyamide imide, there can be used polar solvents, such as dimethyl acetamide or N-methylpyrrolidone.

The production of the magnetic recording material of the invention using these materials can be performed in quite the same way as in the case of using the conventional binders.

Ferromagnetic fine powders used for the production of the magnetic recording materials of this invention are fine powders of $\gamma$-$Fe_2O_3$, $Fe_3O_4$, Co-containing $\gamma$-$Fe_2O_3$, Co-containing $Fe_3O_4$, $Zn_xFe_{(1-x)}O.Fe_2O_3$, $CrO_2$, Fe-Co-Ni alloy, Fe-Co-Cu alloy, or Co-Ni alloy, for example. Examples of the support which can be used in this invention include metal plates, such as aluminum or stainless steel, glass, thermally stable polyester resins, cellulose triacetate, polyimide resins, or polyamide imide resins. As the polyamide imide resins for use as the support, "Kapton" (product of Du Pont) or "Amanin" (product of Westing House) is, for example, suitable for the present invention.

These known ferromagnetic fine powders or supports are not particularly limited for the present invention. The work of the inventors of the present application has led to the confirmation that even when a support of considerably inferior thermal stability is used, the use of the specific polyamide imide resin as a binder can provide magnetic recording materials of considerably improved thermal stability.

The following Examples will further illustrate the present invention, but are not intended to limit the scope thereof.

EXAMPLE 1

| | |
|---|---|
| $\gamma$-$Fe_2O_3$ fine powders | 300 parts by weight |
| graphite | 28 |
| "Pyrodic 100" (polyamide imide resin of Dainippon Ink and Chemicals, Incorporated) | 400 |
| dimethyl acetamide | 600 |

The composition of the foregoing formulation was treated in a ball mill, and the polyamide imide resin was dissolved and $\gamma$-$Fe_2O_3$ fine powder and graphite was uniformly dispersed in the resin solution. The resulting dispersion was uniformly coated on a film of the same polyamide imide resin as above containing a primer layer of 0.2 $\mu$ thick, in a dry thickness of 10 $\mu$, and dried at 180°C. The coated product was cut into tape form to produce magnetic recording tapes.

The tape was mounted in a tape recorder, and caused to run for 3 minutes at 400°C. and then continuously for 25 hours at 200°C. The tape retained their properties.

For comparison, a magnetic recording tape was produced using a polyethylene terephthalate film as a support and a polyurethane resin as a binder. The running test was conducted under the same conditions, and it was found that because of the high temperatures, the tape lost its own shape.

EXAMPLE 2

Example 1 was repeated except that a composition of the following formulation was used instead of the composition used in Example 1.

| | |
|---|---|
| $Fe_3O_4$ fine powders | 300 parts by weight |
| carbon black fine powders | 28 |
| "Pyrodic 252" (polyamide imide resin produced by Dainippon Ink and Chemicals, Incorporated) | 400 |
| dimethyl acetamide | 350 |
| dimethyl formamide | 150 |

The magnetic recording tape so obtained was subjected to a running test for 28 consecutive hours at 200°C. and it was found that it sufficiently retained properties as a magnetic recording material, and proved very tough against frictional injury owing to the magnetic head.

As a comparative sample, a magnetic recording tape was produced using a vinyl chloride/vinyl acetate copolymer as a binder. This magnetic recording tape was useless because the magnetic layer was considerably softened.

EXAMPLE 3

Example 1 was repeated except that a composition of the following formulation was used instead of the composition of Example 1.

| | |
|---|---|
| Fe-Co-Ni alloy fine powder | 300 parts by weight |
| Silicone oil | 5 |
| Polyamide imide resin | 100 |
| Graphite fine powders | 20 |
| Dimethyl acetamide | 600 |

This composition was coated on an aluminum substrate plate by the spin coating method, to produce a magnetic disc. The magnetic disc was subjected to a heat-resistant test in an electric oven at 200°C., but no change was observed on the surface of the disc. When a high load was exerted on the magnetic head and the magnetic layer surface of the disc was rubbed, the wear of the surface was 0.2 $\mu$ at the end of 100 hour period.

On the other hand, the wear was 2.2 $\mu$ in the case of a magnetic disc produced by using an epoxy resin as a binder. It is seen from this that in respect to abrasion resistance, the magnetic recording material of the present invention is superior to conventional magnetic recording materials.

EXAMPLE 4

| | |
|---|---|
| $\gamma$-$Fe_2O_3$ | 300 parts by weight |
| Silicone oil | 2 |
| Fluorine oil | 3 |
| Polyamide imide resin | 150 |
| Dimethyl acetamide | 400 |
| Dimethyl formamide | 150 |

The above composition was treated in a ball mill to form a coating solution. The coating solution was applied on a high tensile strength glass cloth, and dried at 250°C. for 30 minutes. The product was then heat-treated at 280°C. for 30 minutes, and then slit into a width of 1 inch to form a magnetic belt. The magnetic belt obtained was subjected to a durability test in an electric oven at 230°C., and it was found that at the end of 48 hours, it did not show any change.

Although the present invention has been adequately discussed in the foregoing specification and examples included therein, it is readily apparent that various changes and modifications can be made without departing from the spirit and scope thereof.

What is claimed is:

1. A magnetic recording material comprising:
a. a support and
b. a magnetic layer composed of a finely divided powder of a ferromagnetic material dispersed in a polyamide imide resin binder,
wherein said polyamide imide resin has the following repeating structural unit:

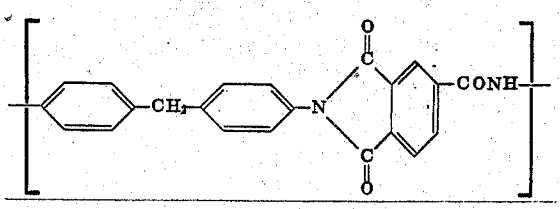

* * * * *